April 26, 1949. P. P. LORD 2,468,602
ATTACHMENT FOR TRACTORS
Filed Oct. 26, 1945

INVENTOR.
PERLEY P. LORD
BY
Charles R. Fay

Patented Apr. 26, 1949

2,468,602

UNITED STATES PATENT OFFICE 2,468,602

ATTACHMENT FOR TRACTORS

Perley P. Lord, South Lancaster, Mass.

Application October 26, 1945, Serial No. 624,873

2 Claims. (Cl. 214—140)

This invention relates to a shovel or the like attachment particularly adapted for detachable assembly on a tractor.

Objects of the invention include the provision of a novel shovel attachment for tractors in which the shovel is operated by power derived from the tractor and mounted on supports in such a way as to distribute the strain involved in the act of shoveling to avoid breaking members such as the rear axle housing and at the same time taking advantage of the effort required to accomplish the shoveling to depress the rear wheels so as to obtain traction necessary for driving the shovel into the material to be moved.

Other objects and advantages of the invention will appear hereinafter.

Reference is to be had to the accompanying drawings, in which

Figure 1:
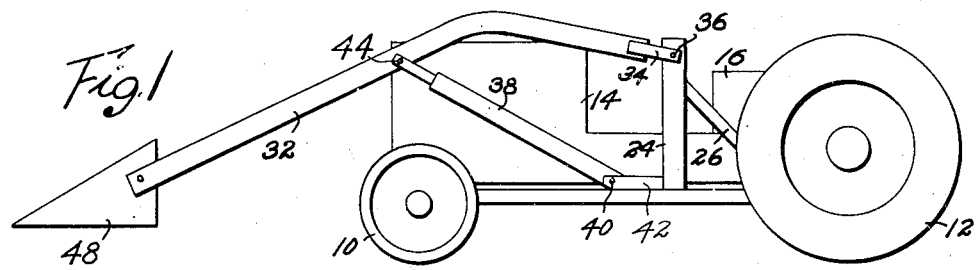
Fig. 1 is a view in side elevation illustrating the attachment applied to a tractor.
Figure 2:
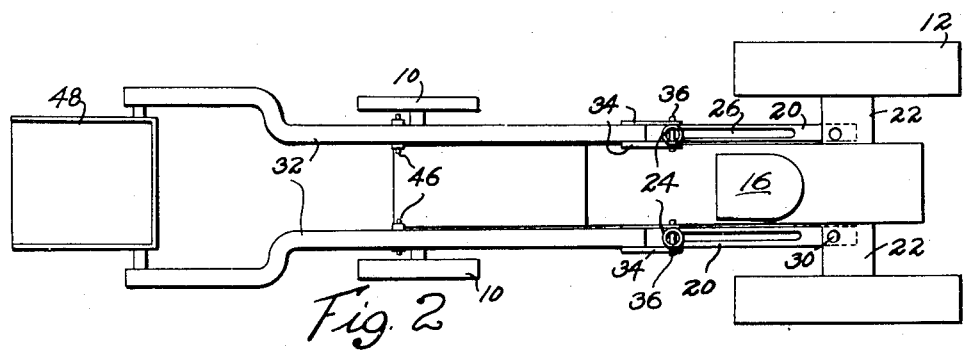
Fig. 2 is a top plan view of the same.
Figure 3:
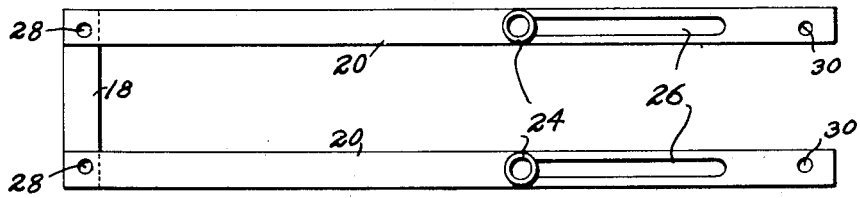
Fig. 3 is a top plan view of the supporting frame for the shovel.
Figure 4:
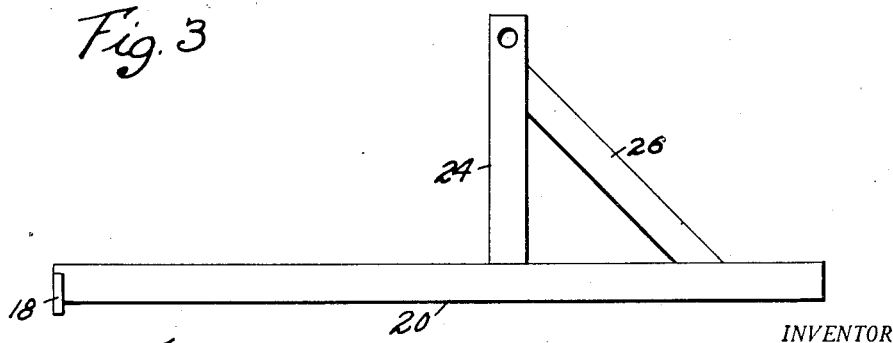
Fig. 4 is a view in side elevation of the parts of Fig. 3.

Figs. 1 and 2 illustrate a tractor having conventional front wheels 10, rear wheels 12, motor at 14 and seat at 16. As is well known, tractors are equipped with hydraulic pumps for the purpose of supplying hydraulic power for the use of the tractor operator.

An angle iron cross piece 18 is adapted to be secured at the front of the tractor in any desired manner and a pair of elongated angle irons 20 are mounted on the cross piece 18. The irons 20 extend rearwardly to be bolted to a convenient part of the tractor as the axle or gear housing 22. Each support 20 is provided with an upright standard 24 welded or otherwise secured thereto and in the particular construction herein illustrated, this standard assumes the form of a pipe. An inclined brace 26 extends from each standard adjacent its upper end downwardly and rearwardly to a point on the supports 20 just short of the rear axle housing 22. The parts 20, 24 and 26 each form a separate unit easily and quickly dismounted from the tractor merely by removing ordinary bolts which extend thru holes 28 into the cross piece 18 and 30 into the rear axle housing 22.

Adjacent the upper end of each standard 24, there is pivoted a lever 32. These levers may assume any shape desired but as here shown, they extend well forwardly of the tractor and are bent downwardly as clearly shown in Fig. 1.

Each lever is provided with a pair of straps 34 which are pivoted to the standard 24 by the means of removable pins 36. These pins may be held in place by cotter pins or other detachable means.

A hydraulic ram 38 is pivoted at 40 to an extension 42 secured to each standard and these rams are also pivoted to the levers 32 intermediate the ends of the latter as at 44. The pivot connections 40 and 44 may assume the form of pins 46 similar to those of 36 and may be easily removed.

The levers 32 are provided with a dump shovel 48. The tractor is adapted to be driven forwardly to thrust the shovel into a pile of material to be moved, and as the shovel penetrates the pile, the rear wheels 12 will be depressed to bite more firmly into the ground by reason of the braces 26. Also, as the operator actuates the mechanism to extend the rams so as to lift the shovel 48, that is, by pivoting the levers 32 in a clockwise direction in Fig. 1, the rear end of the tractor will continue to be depressed. Hence the tractor can move forwardly at the same time the filled shovel is being raised and in this way, traction is always maintained by the driving means 12 so that the operator always has complete control of the tractor and of the shovel.

Merely by removing pins 36 and those at 40, the entire shovel mechanism including the rams 38 and levers 32 may be easily detached and removed and the tractor may be used for other purposes with the frame 24 and 26 still in place on the tractor. However, if the frames are not desired, they in turn may be easily moved merely by removing four bolts as above described.

It will be seen that the above invention presents a relatively simple and efficient shovel attachment which is easily operated and easily and quickly attached or removed from the tractor; and also, there is no danger of injuring the tractor by breaking the rear axle 22 but at the same time, the rear wheels are always pressed into firm connection with the ground, during operation of the attachment.

Having thus described my invention and the advantages thereof, I do not wish to be limited to the details herein disclosed, otherwise than as set forth in the claims, but what I claim is:

1. Attachment for a tractor comprising a removable elongated support to be bolted to the tractor at front and rear thereof on a line offset from the longitudinal axis of the tractor, the rear end of the support being mounted on the rear axle housing, an upright on the support intermediate the ends thereof, an inclined brace from the upright to the support adjacent the rear of the tractor to transmit stresses to the support and rear wheels of the tractor, a lever pivoted at one end to the upright, a ram pivoted to the lever, and to the attachment, and a shovel on the lever.

2. The attachment of claim 1 including removable pivot pins for the lever and upright and ram and attachment.

PERLEY P. LORD.

REFERENCES CITED

The following references are of record in the file of this patent:

UNITED STATES PATENTS

| Number | Name | Date |
|---|---|---|
| 2,001,803 | Stephens | May 21, 1935 |
| 2,304,443 | Butler | Dec. 8, 1942 |
| 2,319,921 | Dooley et al. | May 25, 1943 |
| 2,349,335 | Baldwin | May 23, 1944 |
| 2,387,656 | Gledhill | Oct. 23, 1945 |
| 2,391,224 | Carter | Dec. 18, 1945 |
| 2,395,622 | Galbreath | Feb. 26, 1946 |
| 2,397,303 | Vowless | Mar. 26, 1946 |
| 2,412,323 | Conrad | Dec. 10, 1946 |
| 2,417,021 | Simmonds | Mar. 4, 1947 |
| 2,426,544 | Wooldridge | Aug. 26, 1947 |